United States Patent
Patel et al.

(10) Patent No.: US 10,767,265 B2
(45) Date of Patent: Sep. 8, 2020

(54) INORGANIC PHOSPHATE CORROSION RESISTANT COATINGS

(71) Applicant: Latitude 18, Inc., Sims, NC (US)

(72) Inventors: Sameerkumar Vasantlal Patel, Sims, NC (US); Benjamin Chaloner-Gill, Sims, NC (US); Anthony V. Collins, Sims, NC (US)

(73) Assignee: Latitude 18, Inc., Sims, NC (US)

( * ) Notice: Subject to any disclaimer, the term of this patent is extended or adjusted under 35 U.S.C. 154(b) by 0 days.

(21) Appl. No.: 16/262,567

(22) Filed: Jan. 30, 2019

(65) Prior Publication Data

US 2019/0186020 A1    Jun. 20, 2019

Related U.S. Application Data

(63) Continuation of application No. 14/911,996, filed as application No. PCT/US2014/050707 on Aug. 12, 2014, now abandoned.
(Continued)

(51) Int. Cl.
   *C23C 22/00* (2006.01)
   *C23C 22/22* (2006.01)
   (Continued)

(52) U.S. Cl.
   CPC .............. *C23C 22/22* (2013.01); *C04B 28/34* (2013.01); *C04B 35/447* (2013.01); *C09D 5/084* (2013.01);
   (Continued)

(58) Field of Classification Search
   None
   See application file for complete search history.

(56) References Cited

U.S. PATENT DOCUMENTS

| 5,064,468 A | 11/1991 | Okai et al. |
| 8,858,702 B2 | 10/2014 | Wagh et al. |

(Continued)

FOREIGN PATENT DOCUMENTS

| JP | 2000208321 A | 7/2000 |
| KR | 1020120101541 A | 9/2012 |
| WO | 95/35266 | 12/1995 |

OTHER PUBLICATIONS

Indian Patent Office; Office Action for Indian Patent Application No. 201617008239 dated Mar. 14, 2019, 6 Pages.
(Continued)

*Primary Examiner* — Stefanie J Cohen
(74) *Attorney, Agent, or Firm* — Christopher J. Knors; Moore & Van Allen PLLC (57) ABSTRACT

This disclosure relates to compositions for protecting a metallic surface susceptible to corrosion, the composition comprising a first component comprising an aqueous mixture of an acid-phosphate of chemical formula $A^m(H_2PO_4)_m \cdot nH_2O$, where A is hydrogen ion, ammonium cation, metal cation, or mixtures thereof where $m=1-3$, and $n=0-6$; the first component solution adjusted to a pH of about 2 to about 5, the first component having a particle size distribution between 0.04 to 60 micron; and a second component, configured for combination and at least partial reaction with the first component to provide a phosphate ceramic, the second component comprising an aqueous solution or suspension of an alkaline oxide or alkaline hydroxide represented by $B^{2m}O_m$, $B(OH)_{2m}$, or mixtures thereof, where B is an element of valency $2m$ ($m=1$, 1.5, or 2) the second component solution adjusted to a pH of between 9-14.

8 Claims, 2 Drawing Sheets

Related U.S. Application Data (60) Provisional application No. 61/865,115, filed on Aug. 12, 2013.

(51) Int. Cl.
    *C04B 28/34*     (2006.01)
    *C23C 22/68*     (2006.01)
    *C04B 35/447*     (2006.01)
    *C09D 5/08*     (2006.01)
    *C04B 111/00*     (2006.01)

(52) U.S. Cl.
    CPC ..... *C23C 22/68* (2013.01); *C04B 2111/00525* (2013.01)

(56) References Cited

U.S. PATENT DOCUMENTS

| | | |
|---|---|---|
| 2002/0179190 A1 | 12/2002 | Brown et al. |
| 2005/0229809 A1 | 10/2005 | Lally |
| 2011/0143154 A1 | 6/2011 | Wagh et al. |
| 2011/0143910 A1* | 6/2011 | Wagh ........................ C01B 25/36 501/134 |
| 2011/0254190 A1* | 10/2011 | Wagh ........................ C04B 28/34 264/128 |

OTHER PUBLICATIONS

Jaskova, Veronika, et al.; "Anticorrosive coatings containing modified phosphates," Progress in Organic Coatings, 2012, pp. 328-334, vol. 75.
International Bureau of WIPO, International Preliminary Report of Patentability for International Application No. POT/US2014/050707 dated Feb. 25, 2016, 8 Pages.
Korean Intellectual Property Office; International Search Report and Written Opinion for International Application No. PCTMS2014/050707 dated Nov. 17, 2014, 11 Pages.
SIPO; Chinese Office Action for Chinese Application No. 201480056252.4 dated Jun. 1, 2017, 15 pages.
EPO; Search Report for European Application No. 14836005.0 dated May 9, 2017, 8 pages.
SIPO; Office Action for Chinese Application No. 201480056252.4 dated Jan. 5, 2018, 12 pages.
Chinese Patent Office; Office Action for Chinese Patent Application No. 201480056252.4 dated Aug. 16, 2018, 7 pages.
EPO; Office Action for European Patent Application No. 14836005.0 dated Nov. 27, 2018, 4 Pages.
Chinese Patent Office; Office Action for Chinese Patent Application No. 201480056252.4 dated Dec. 5, 2018, 7 Pages.

* cited by examiner

INORGANIC PHOSPHATE CORROSION RESISTANT COATINGS

CROSS-REFERENCE TO RELATED APPLICATIONS

This application is a continuation application of U.S. patent application Ser. No. 14/911,996, filed Feb. 12, 2016, now abandoned, which is a 371 application and claims the benefit of International Patent Application No. PCT/US2014/050707, filed on Aug. 12, 2014, which claims benefit to U.S. Provisional Application No. 61/865,115, filed on Aug. 12, 2013, which is hereby incorporated by reference in its entirety.

TECHNICAL FIELD

This disclosure relates to coatings comprising acid-phosphate and alkaline metal oxide/hydroxide components that inhibit corrosion of metals, and specifically, the manufacture and method of coating phosphate ceramics on metal.

BACKGROUND

Corrosion of structural steel and other metals is a serious problem in construction and utility industry. When exposed to humid and saline environments, especially at elevated temperatures, steel deteriorates. To minimize or reduce the extent of this corrosion, alloys of steel, such as galvanized (zinc coated) compositions, or chrome plated compositions are used. While this approach may solve the problem in the short run, the problem persists when the steel is exposed to the above-mentioned environments over long periods of time. This invention discloses uniquely-suited phosphate-based composite coatings that minimize or reduce the corrosion of steel or other metals and make it unnecessary to use alloys of steel such as galvanized (zinc coated) compositions or chrome plated compositions.

Phosphating to passivate a steel surface is generally known in the steel industry. Typically, well polished steel is immersed in phosphate bath of pH between 4-4.5 containing 2-3 g/L phosphoric acid, 2-3 g/L of ammonium or zinc dihydrogen phosphate as buffer, and a small amount (<0.5 g/L) of oxidizer, to produce an iron phosphate passivation layer. In the process, however, hydrogen gas is liberated by the reaction of elemental iron with water in the extremely acidic environment. This produces a very thin passivation layer that is porous and not abrasion resistant, and as a result, an additional coating is required to make the surface of the passivated steel inaccessible to atmospheric oxygen and/or abrasion resistant. This process has, therefore, at least the following disadvantages: (i) an acid immersion bath/tank, which generates sludge as formed by accumulating reaction products—making the bath less effective and creating environmental disposal issues for the sludge and the acidic solution; (ii) oxidizers used in the passivation process produce toxic gases. For example, chlorates produce chlorine, meta nitro benzene sulfonic acid produces nitrous oxide, potassium permanganate presents occupational health risks; (iii) resultant passivation layers are not abrasion resistant, therefore, abrasion resistance must be augmented by additional coating(s).

SUMMARY

In a first embodiment, a phosphate ceramic precursor composition is provided. The composition comprising a first component comprising an aqueous mixture of an acid-phosphate of chemical formula $A^m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5, the first component having a particle size distribution between 0.04 to 60 micron; and a second component, configured for combination and at least partial reaction with the first component to provide a phosphate ceramic, the second component comprising an aqueous mixture of an alkaline oxide or alkaline hydroxide represented by $B^{2m}O_m$, $B(OH)_{2m}$, or mixtures thereof, where B is an element of valency 2m (m=1, 1.5, or 2) the second component solution adjusted to a pH of between 9-14.

In a first aspect of the first embodiment, about 50 percent of the particle size distribution of the first component is particles having a particle size less than 50 microns, less than 40 microns, less than 30 microns, or less than 20 microns. The minimum of particle sizes being about 0.04 micron, about 0.4 micron, or about 4 micron.

In a second aspect, alone or in combination with any one of the previous aspects of the first embodiment, about 90 percent of the particle size distribution of the first component is particles having a particle size less than 50 microns, less than 40 microns, or less than 30 microns.

In a third aspect, alone or in combination with any one of the previous aspects of the first embodiment, the first component average particle size is about 20 microns to about 30 microns.

In a fourth aspect, alone or in combination with any one of the previous aspects of the first embodiment, the first component comprises at least one of mono potassium phosphate and mono calcium phosphate, water, and optionally about 2 to about 10 wt. % phosphoric acid.

In a fifth aspect, alone or in combination with any one of the previous aspects of the first embodiment, the second component is at least one of magnesium oxide, calcium oxide, magnesium hydroxide, and calcium hydroxide, and water.

In a sixth aspect, alone or in combination with any one of the previous aspects of the first embodiment, the composition further comprising at least one corrosion inhibitor precursor of a mineral silicate, wollastonite, talc, amorphous magnesium silicate, amorphous calcium silicate, diatomaceous earth, silicon dioxide, and amorphous silicon dioxide.

In a seventh aspect, alone or in combination with any one of the previous aspects of the first embodiment, either of the first component or the second component is present in an amount of at least about 60 wt % to about 80 wt %.

In an eighth aspect, alone or in combination with any one of the previous aspects of the first embodiment, the composition further comprising further comprising a rheology modifier/suspending agent, the rheology modifier/suspending agent is at least one of guar gum, diutan gum, welan gum, and xanthan gum present in an amount of 0.15-15 weight percent.

In a second embodiment, a method of providing corrosion protection to a metal surface is provided. The method comprising contacting a metal surface with a first component and a second component, in any order or in combination; wherein the first component comprises an aqueous mixture of an acid-phosphate of chemical formula $A^m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5, the first component having a particle size distribution between 0.04 to 60 micron; and wherein the second component comprises an aqueous mixture of an alkaline oxide or alkaline hydroxide represented by $B^{2m}O_m$, $B(OH)_{2m}$, or mixtures thereof, where B is an element of valency 2m (m=1, 1.5, or 2) the second component solution adjusted to a pH of between 9-14.

In a first aspect of the second embodiment, about 50 percent of the particle size distribution of the first component is particles having a particle size less than 50 microns, less than 40 microns, less than 30 microns, or less than 20 microns.

In a second aspect, alone or in combination with any one of the previous aspects of the second embodiment, about 90 percent of the particle size distribution of the first component is particles having a particle size less than 50 microns, less than 40 microns, or less than 30 microns.

In a third aspect, alone or in combination with any one of the previous aspects of the second embodiment, the first component average particle size is about 20 microns to about 30 microns.

In a fourth aspect, alone or in combination with any one of the previous aspects of the second embodiment, the first component comprises at least one of mono potassium phosphate and mono calcium phosphate, water, and optionally about 2 to about 10 wt % phosphoric acid.

In a fifth aspect, alone or in combination with any one of the previous aspects of the second embodiment, the second component is at least one of magnesium oxide, calcium oxide, magnesium hydroxide, and calcium hydroxide, and water.

In a sixth aspect, alone or in combination with any one of the previous aspects of the first embodiment or the second embodiment, further comprising at least one of a mineral silicate, wollastonite, talc, amorphous magnesium silicate, amorphous calcium silicate, diatomaceous earth, silicon dioxide, and amorphous silicon dioxide.

In a seventh aspect, alone or in combination with any one of the previous aspects of the second embodiment, either of the first component or the second component is present in an amount of at least about 60 wt % to about 80 wt %.

In an eighth aspect, alone or in combination with any one of the previous aspects of the second embodiment, further comprising further comprising a rheology modifier/suspending agent, the rheology modifier/suspending agent is at least one of guar gum, diutan gum, welan gum, and xanthan gum present in an amount of 0.15-15 weight percent.

In a ninth aspect, alone or in combination with any one of the previous aspects of the second embodiment, a product produced by the method is provided.

In a third embodiment, an inorganic phosphate compound is provided of the general formula:
  i) $B^s(A_{3-m}PO_4)_s$; wherein A has a valency of m=1 or 2; and B has a valency of s=1, or 2;
  ii) $B^s(A_{(2/m)}PO_4)_s$; wherein A has a valency of m=1 or 2; B has a valency of s=1, or 2;
  iii) $^{(2/m)}A_3B_m(PO_4)_2$; wherein A has a valency of m=1 or 2; B has a valency of 3; or
  iv) $B(AOPO_4)_s$; wherein A has a valency of 4 and s=1 or 2; and B has a valency of 1, or 2;

In a first aspect of the third embodiment, the inorganic phosphate i-iv has less than 0.000001 to 10 percent of unreacted, crystalline inorganic acid phosphate of an average particle size greater than about 60 microns.

In a second aspect, alone or in combination with any one of the previous aspects of the third embodiment, the inorganic phosphate is at least one of the following: $MgKPO_4$; $Mg(ZnPO_4)_2$ $Mg(K_2PO_4)_2$; $Mg_2KPO_4$; $Mg(ZnPO_4)_2$; $Mg(K_2PO_4)_2$; $Al_2Mg_3(PO_4)_2$; $Mg(ZrOPO_4)_2$; $Mg[Zr(OH)_2PO_4)_2]_2$; and calcium/magnesium phosphate.

In a third aspect, alone or in combination with any one of the previous aspects of the third embodiment, less than 0.000001 to 10 percent of the unreacted, crystalline inorganic acid phosphate is of an average particle size distribution greater than about 50 microns, less than 40 microns, or less than 30 microns.

In a fourth aspect, alone or in combination with any one of the previous aspects of the third embodiment, the inorganic phosphate has a density less than 1.8 g/cm$^3$ or less than 1.5 g/cm$^3$.

DETAILED DESCRIPTION

In general, disclosed herein are multi-component formulations comprising at least one acidic phosphate first component and at least one alkaline second component, the first and second components being suitable for providing, upon combination, an inorganic phosphate composition.

As used herein, the phrase "aqueous mixture" refers to a combination of at least a quantity of water and at least one of the sparingly soluble acid phosphate or basic component. For example, the aqueous mixture can contain mostly water and suspended, dispersed, or slurried components, and may also contain non-aqueous components such as alcohols and other solvents. Preferably, water is the major liquid phase. The amount of solids (e.g., the sparingly soluble acid phosphate or basic component and/or other solids) present in the aqueous mixture can be between 1 wt. % to about 80 wt. %, preferably 50-80 wt. % solids.

As used herein, the phrases "sparingly soluble acidic phosphate component" and "acidic phosphate precursor" and "acid component" and "acid-phosphate component" and "Part A" are used interchangeably unless otherwise indicated. As used herein, the phrase "sparingly soluble acidic phosphate component" refers to inorganic acid-phosphates of chemical formula $A^m(H_2PO_4)_m \cdot nH_2O$, where A is metal cation, or mixtures thereof; where m=1-3, and n=0-6. Such inorganic phosphates typically have low solubility constants characteristic of low aqueous solubility, e.g., solubility constants (Ksp) of at least $10^{-6}$, $10^{-7}$, $10^{-8}$, $10^{-9}$ or smaller. In one aspect, the phrase "sparingly soluble acidic phosphate component" excludes phosphoric acid or ammonium phosphates, however, non-stoichiometric amounts (e.g., less than 10 weight percent to that of the acid phosphate component) of phosphoric acid can be used to adjust pH of the aqueous phosphate precursor compositions. Because solubility product constants may be pH dependent, the above phrase includes the addition of small amounts of phosphoric acid to the aqueous mixture of sparingly soluble acidic phosphate component to provide a target solubility product constant relative to that of the basic component.

As used herein phrases "sparingly soluble basic metal oxide and sparingly soluble basic metal hydroxide component" and "sparingly soluble basic component" and "sparingly soluble alkaline component" and "sparingly soluble alkaline precursor" are used interchangeably unless otherwise indicated. The phrases "sparingly soluble basic component" and "sparingly soluble alkaline component" and "sparingly soluble alkaline precursor" are inclusive of materials that are sparingly soluble, e.g., have low solubility product constants in aqueous media, e.g., solubility constants (Ksp) of at least $10^{-6}$, $10^{-7}$, $10^{-8}$, $10^{-9}$ or smaller. In one aspect, the phrases "sparingly soluble basic metal oxide and sparingly soluble basic metal hydroxide component" and "sparingly soluble basic component" and "sparingly soluble alkaline component" and "sparingly soluble alkaline precursor" are exclusive of materials that are readily soluble, e.g., have high solubility product constants in aqueous media. In one aspect, the sparingly soluble acid phosphate has a solubility product constant that is greater than the sparingly soluble basic component when used in forming the acid/base phosphate coating.

The uniquely-suited formulations and methods disclosed and described herein are based in one aspect on acid-base inorganic phosphate compositions. It is believed that similar principles are applicable for other acid/base pair compositions other than inorganic phosphates. Examples of the inorganic phosphate coatings provided herein include a magnesium potassium phosphate coating, and calcium potassium phosphate coating. These compositions are disclosed herein for coatings on steels, aluminum, and other metals as corrosion inhibitors. When applied to a metal surface as a paste, spray or vapor coating, the compositions react depending on their solubility product constants, e.g., where the more soluble component (e.g., preferably the acidic component) reacts with ions associated with the bulk metallic surface substantially or to an extent before the less soluble component (e.g., the basic component). After reactions of the more soluble component with the ions of the bulk metallic surface, the second component reacts providing an alloying surface zone that is chemically bound to the metallic surface and includes the reaction products of the ions associated with the metallic surface (e.g., metal ions), and in combination, the acid/base components, bonding therewith and forming a thin layer/coating to the metallic surface. The bonded layer is hard and inhibits corrosion of the metal surface. A range of phosphate-based formulations may be used to coat and prevent or minimize the corrosion of metallic surfaces. The metallic surface can be pristine, polished, and/or contain pre-existing corrosion. By selecting the acid component and basic component based on their solubility in the media used to apply them to the metallic surface, the aforementioned reaction products form that provide an improved corrosion coating for the bulk metal.

The instant compositions can be configured as atomizible, sprayable inorganic phosphate precursor compositions that can be sprayed at a relatively thin thickness. The compositions can hold high solids contents and yet still hold the solids until setting and thus avoiding the solids migrating or dislodging from the point of application, e.g., down a wall, beam, curved surface, or from a ceiling surface. Such spray coated phosphate ceramic compositions produce high-strength, rapid-setting phosphate ceramic coatings that provide corrosion protection and/or be used as an undercoating in combination with a polymeric coating or paint, such as an acrylic- or urethane-based coating or paint. In one aspect, said phosphate spray coating compositions are suitable for spray coating on metal surfaces, for example, structural elements such as tanks and other storage structures, as well as chassis of transportation vehicles such as automobiles, trains, cycles, aerospace vehicles, trucks, and buses.

Proper particle size selection of one or more of the precursor materials provides improved corrosion protection relative to conventional phosphate coatings. Proper selection of solubility of one or more of the precursor materials provides improved corrosion protection relative to conventional phosphate coatings. Dense, hard, large crystals are likely to go into solution and/or react slower and therefore may not completely dissolve and/or react during the formation the ceramic coating and/or inhibit or alter the formation of the passive layer on the metal surface. If they remain behind after the coating has set up such dense, hard, large crystals are likely to cause corrosion if in proximity to the metal surface. Of course, the use of acid-phosphate precursors that are completely soluble or are rapidly solubilized cause excessive exothermic heat generation and/or react violently resulting in poor coating properties. Thus, the combination of proper particle size selection and solubility of one or more of the precursor materials as disclosed and described herein provides improved corrosion protection relative to conventional phosphate coatings. Unreacted crystals of acid phosphate precursor (e.g., first component) that, for example, do not dissolved in the formulation prior to set-up, or do not react with a stoichiometric amount of base component will eventually dissolve and leave a void in the coating and/or if in contact with a metal surface, commence with an acid-metal reaction that can lead to pitting and other corrosion-related issues.

It has now been determined that proper selection of particle size commensurate with solubility of the acid-phosphate component precursor effectively reduces or eliminates corrosion caused by the precursors themselves as well as providing an improved corrosion coating for the metal surface.

In one aspect, the average particle size of the acid-phosphate precursor material is less than 600 microns. Preferably, the average particle size of the acid-phosphate precursor material is less than 60 microns, less than 50 microns, less than 40 microns, less than 30 microns, or less than 20 microns.

Very small particle size phosphate acid (or acid-phosphate) precursors are achievable with milling or other commutation techniques alone or in combination with surfactants. The present method is particularly advantageous with certain low solubility or "sparingly soluble" components, e.g., monopotassium phosphate (MKP) solid in particulate form.

By way of example, the particle size of the acid-phosphate component can determine whether the resultant ceramic coating is going to provide corrosion protection or actually contribute to localized corrosion after coating. Whatever solid phosphate component is chosen, it is preferred that it go completely into solution and/or react with the basic component before or during set-up. While some chemistry of the phosphate component and the metal surface is desirable and indeed, beneficial, if un-reacted phosphate component is localized in the solid ceramic and in proximity to the metal surface, and in this localized environment the basic component is substantially absent or of a non-stoichiometric amount relative to the acid component, overtime and via egress of water, corrosion and/or pitting of the steel surface will likely result. This problem is exacerbated by the presence of large, unreacted particles (e.g., greater than 70 micron, and especially greater than 100-1000 micron average diameter particles) of an acid phosphate components present throughout the hardened ceramic that ultimately react with residual base and/or water that has seeped into the coating leaving behind in the ceramic a porous structure that further promotes water egress. Balancing this is the observation that very small particles of acid and base components tend to react rather quickly reducing setup time and shelflife, which has diverted interest in pursuing extremely small particle size formulations without the need for additional chemistries to retard or otherwise inhibit fast reaction rates and exothermic phenomena that likely would otherwise occur.

Figure 1:
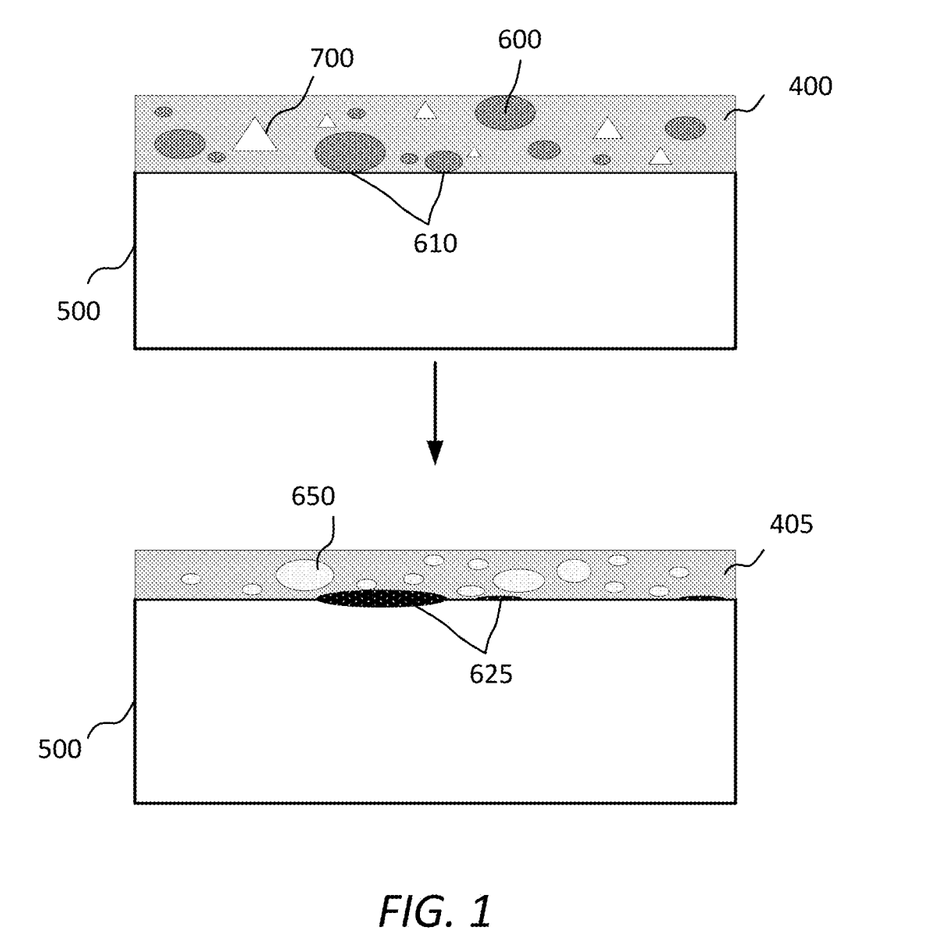
FIG. 1 is an illustration of a corrosion protection layer of a phosphate ceramic coating composition.

The above is schematically depicted in FIG. 1, which depicts a conventional phosphate chemistry formulation having particles of acid component 600 greater than about 70 micron and base component 700 combined as a coating 400 on metal surface 500. After set-up and over a time period less than the average useable life of the metal object having the coated surface, the unreacted, crystalline base components and the acid components of coating 405 react or dissolve, leaving behind porous voids 650 of approximate size or slightly smaller or larger of that of the crystal(s) present at set up. Of particular concern is the acid-phosphate crystals left in proximity 610 to the metal surface-coating interface, which is capable of undergoing the acid-metal reaction and generating hydrogen gas. These particular localized, unreacted acid-phosphate crystals contribute to pitting 625 and other types of corrosion of the metal surface and are undesirable in a coating designed for corrosion protection. It is therefore provided herein in at least one embodiment of the present disclosure to eliminate or reduce the number of large, unreacted acid-phosphate crystals that can be present in the corrosion coating prior to and during setup and subsequently thereafter.

Figure 2:
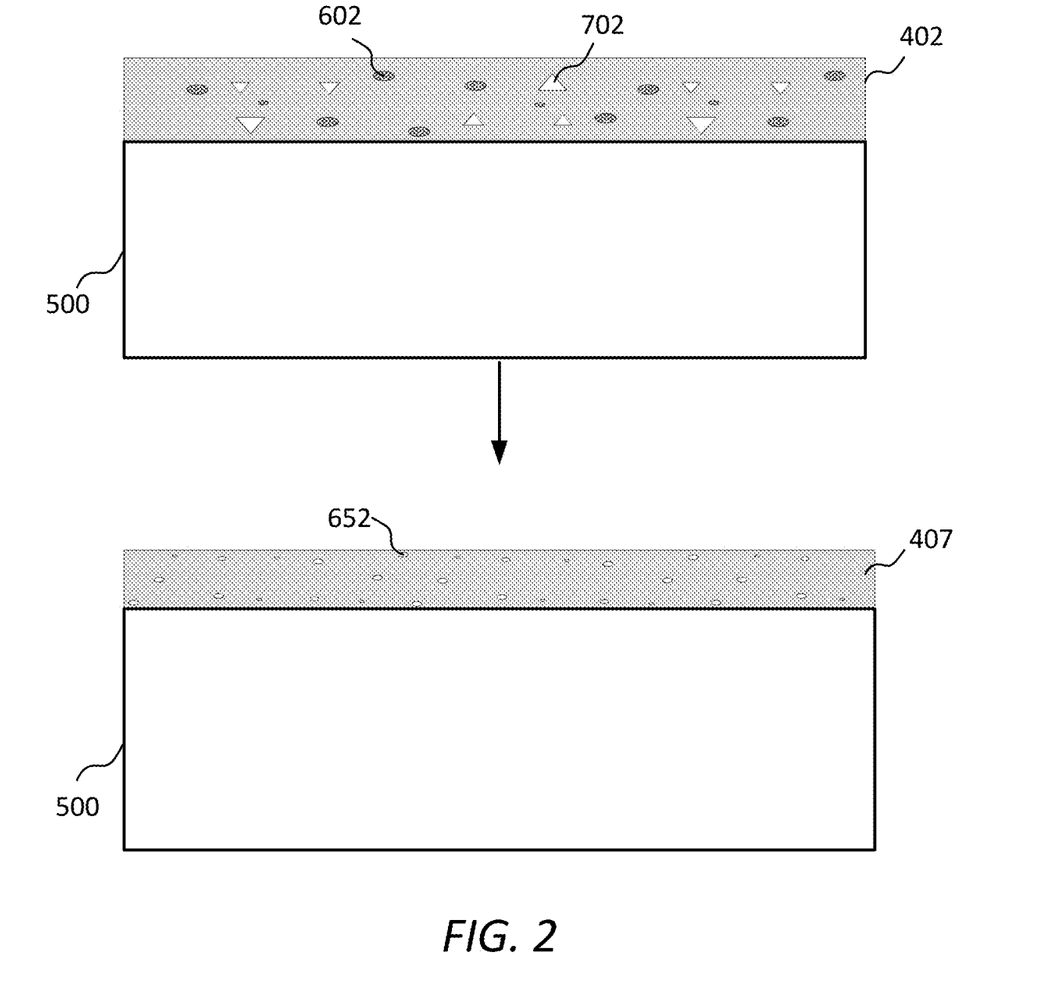
FIG. 2 is an illustration of a corrosion protection layer of a phosphate ceramic coating composition as disclosed and described herein.

Thus, as depicted in FIG. 2, the phosphate chemistry formulation of the present disclosure, having particles of acid component 602 less than about 60 micron, and base component 702 combined and cast as a coating 402 on metal surface 500. After set-up and over a time period less than the average useable life of the metal object having the coated surface, the unreacted, crystalline base components and the acid components of coating 405 react or dissolve, leaving behind significantly smaller porous voids 652 of approximate size to that of the crystal(s) present at set up or slightly smaller or larger and with substantially less crystals present at the metal surface-coating interface so as to prevent or eliminate post-coating pitting or other types of corrosion of the metal surface.

In various aspects, a multi-component formulation is provided, comprising at least one acidic component and at least one alkaline component. Both components of the multi-component formulation are provided as solutions, emulsions, dispersions, pastes, or combinations thereof. Each of the components can be produced separately and stored separately, and may be dispensed separately or in combination. The components ultimately are combined prior to or during application and are allowed to react to form an inorganic phosphate composition.

Thus, in one aspect, a phosphate ceramic precursor composition is provided comprising a first component comprising an aqueous mixture of an acid phosphate having a particle size distribution between 0.04 to 60 micron. In another aspect, about 50% of the particle size distribution of the first component is particles of less than 50 micron, less than 40 micron, less than 30 micron, or less than 20 micron. In another aspect, about 90% of the particle size distribution of the first component is particles having a particle size less than 40 micron, less than 30 micron, or less than 20 micron. In yet another aspect, the first component average particle size is between about 20 micron to about 30 micron. The present coatings provide excellent corrosion resistance and also improved resistance to pitting and other corrosion related phenomenon as well as providing a more dense, less porous phosphate ceramic by virtue of the reduction in size of voids typically created by the post-set reaction and/or dissolution of the acid phosphate crystals.

The phosphate ceramic composition can comprise an acidic phosphate component comprising an aqueous solution, suspension, or slurry of an acid-phosphate, for example, of chemical formula $A^m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5; a basic component, comprising, for example, an aqueous solution, suspension, or slurry of an alkaline oxide or alkaline hydroxide represented by $B_2mOm$, $B(OH)_2m$, or mixtures thereof, where B is an element of valency 2m (m=1, 1.5, or 2) the second component solution adjusted to a pH of between 9-14; and a rheology modifier/suspending agent in an amount capable of providing shear thinning of either the first component or the second component and further capable of suspending a high solids content of either the first component or the second component for atomization. Optionally, pigments and/or aggregate material can be present in an amount in at least one of the acidic phosphate and the basic component capable of imparting an observable color and/or texture. The above composition can be configure as an atomizible spray coating that can provide a thin, paint-like coating for imparting corrosion resistance to metallic surfaces. The rheology modifier/suspending agent can be at least one of guar gum, diutan gum, welan gum, and xanthan gum. By using an optional rheology modifier/suspending agent in an amount capable of providing shear thinning of the basic component and further capable of suspending a high solids content of either the acidic component or the basic component for atomization, excellent paint-like coatings for imparting corrosion resistance to metallic surfaces are obtained.

Processes and articles prepared by coating with the aforementioned formulation are disclosed and described herein and such coated articles overcome many if not all of the problems related to conventional passivation processes of iron, steels, aluminum, and other corrodible metals. The instant processes also provide a more economical, environmentally-friendly method of coating steel and other metal surfaces with acid-base inorganic phosphate based coatings that not only passivate the layer but also provide abrasion resistance along with good aesthetics in one step.

The instant coatings disclosed herein can comprise, in part, the formation of poly phosphates, and in particular, poly phosphates formed by phosphites at the interfacial regions of the substrate surface in the instant coating. Polyphosphate can provide abrasion resistance and impermeablity to water and humidity, thus improving abrasion resistance as well as improving corrosion resistance to the substrate surface.

In one aspect, an acid-phosphate composition, one acidic with a pH between about 3 to about 4.5, and the other, an alkaline component with a pH between about 10 and about 11. These two components are contacted with the substrate surface, where they combine form a coating. For example, mono potassium phosphate ($KH_2PO_4$) and a magnesium hydroxide ($Mg(OH)_2$, or its brine) composition with or without fillers such as wollastonite ($CaSiO_3$) or fly ash, can be combined and contacted with a corrodible metal surface (e.g., steel). Once the compositions contact the surface, a coating forms that bonds instantly to the substrate. While not wishing to be held to any particular theory, it is believed that the contact by the acidic phosphate and an alkaline oxide or hydroxide, or oxide mineral components provides an initial passivation layer (sub-, primer, or bottom layer) as well as the corrosion protective layer.

In certain aspects of the present disclosure, the metallic surface is that of a transition metal or its alloy, for example, iron, chromium, aluminum, copper, etc.

Acidic phosphate component—The acidic phosphate component consists of an acid-phosphate representative of the formula, $A^m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 (FeO and $Fe_2O_3$ as oxides), A can be the metal of lower oxidation state. It can also be a cation of oxides of four-valent metal oxide such as $ZrO^{2+}$, in which case m=2. $nH_2O$ in the formula above is simply the bound water, where n can be any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate $(Mg(H_2PO_4)_2)$ or aluminum trihydrogen phosphate $(AlH_3(PO_4)_2)$ by neutralizing partially using an alkaline oxide, hydroxide, or a mineral, or by acidifying a dihydrogen phosphate such as mono potassium phosphate $(KH_2PO_4)$ that has a pH>3.5 by adding a small but appropriate amount of phosphoric acid or a low pH acid phosphate such as $Mg(H_2PO_4)_2$ or aluminum trihydrogen phosphate $AlH_3(PO_4)_2$. Examples described later in this document provide the art of adjusting this pH.

Often the acid-phosphate solid used as the precursor is only partially soluble. In such a case, the acid-phosphate precursor is milled (wet or dry milling or other grinding or size-reduction technique) so that the particles pass through 325 mesh sieve (less than 50 micron), 400 mesh sieve (less than 38 micron), 450 mesh sieve (less than 32 micron), 500 mesh sieve (less than 25 micron), or 635 mesh sieve (less than 20 micron). In one aspect, the acid phosphate has a solubility product constant that is greater than the basic component used in forming the acid/base phosphate coating.

Water may be added to the precursor component to reduce the viscosity thereof, or other types of viscosity reducing agents may be used. Commercial additives that prevent algae growth may also added to this precursor so that no algae growth occurs during storage of this precursor.

The Basic component or precursor comprises one or more basic oxides, hydroxides and basic minerals. The basic component generally consists of a sparsely soluble oxide, or preferably a hydroxide with a solubility product constant less than the acid phosphate precursor. In one aspect, a particle size less than 230 micron or of a size commensurate with that of the acid component discussed above. The oxide may be represented by the formula $B^{2m}O_m$ or $B(OH)_{2m}$, where B is a 2m-valent metal. All divalent metal oxides (m=1), and some trivalent metal oxides in reduced state fall into this category of small solubility product constant oxides. Examples of divalent oxides are, but not limited to, magnesium oxide, barium oxide, zinc oxide, calcium oxide and copper oxide. Examples of trivalent oxides in reduced state are iron oxide (FeO), and manganese oxide (MnO). In preferred aspects of the instant disclosure, 0 to about 10 molar excess of basic component relative to acidic component is used. For example, about 0-10 molar excess of $Mg(OH)_2$ based on MKP acidic phosphate can be used. In one aspect, the molar ratio of acid:base components can be between about 0.9:1.0 to about 1.0:3.0; preferably about 1.0:2.0; and most preferably, about 1.0:1.8. For example, the composition comprising $Mg(OH)_2:KH_2PO_4=1.8:1.0$ provides equal volumes of Parts A and B during spraying. In other aspects, spray coatings of the instant compositions having a molar ratio of about 1:2 or about 1:1.5 (acid:base) with mixing, sprayed well and corrosion protected effectively.

Inorganic Phosphate Coating Compositions

A range of phosphate compositions may be used as the corrosion inhibitor coatings commensurate with the spirit and scope of that disclosed and described herein, the following three exemplary, non-limiting examples are provided:

1. Magnesium potassium phosphate coating formed by the combination and/or reaction of magnesium oxide (MgO) and mono potassium phosphate $(KH_2PO_4)$, which in the presence of water combine to produce magnesium potassium phosphate ceramic, comprising $MgKPO_4 \cdot 6H_2O$. Magnesium potassium phosphate is also referred to hereafter as "MKP".
2. Magnesium hydrogen phosphate (newberyite) coating formed by the combination and/or reaction of magnesium oxide (MgO) and phosphoric acid solution ($H_3PO_4$ solution), which when mixed well and allowed to dry, combine to produce a magnesium hydrogen phosphate coating comprising $MgHPO_4 \cdot 3H2O$.
3. Magnesium hydrogen phosphate (newberyite) coating formed by the combination and/or reaction of magnesium dihydrogen phosphate compositions usually have an aqueous pH between about 2.5 and about 5.0. Magnesium hydrogen phosphate is also referred to hereafter as "MHP". MHP solutions with a pH of about 3 or slightly higher are generally believed more effective in the production of corrosion resistant products and, for at least that reason, tend to be preferred.

Under ambient conditions, aqueous mixtures of magnesium potassium phosphate compositions and magnesium hydrogen phosphate compositions exhibit a paste-like consistency that can be shear thinned to be atomizable for spraying. When these compositions are applied to a surface, e.g., steel, as coatings, it is believed that one or more reaction occurs, and/or the one or more reaction occur at different rates, and a thin layer of the above compositions bonds to the metallic surface. The remaining parts of the coatings distal from the metallic surface can be loosely bound and can be easily scraped off, but the layer or coating is thin it remains and is very hard, resistant to abrasion, and inhibits corrosion of the surface. Thus, in one aspect, this thin layer provides protection of the metallic surface from corrosion. Similar results are observed when these compositions are applied to the surface of other metals besides steel, such as aluminum. It is believed that the same effects would be observed for copper, nickel, tungsten, vanadium and other transition metals prone to oxidation at pH's of between about 2 to about 11, and potentials of about 2 eV to about −2 eV.

In another aspect, the above phosphate ceramic precursor components are utilized to form an inorganic phosphate compound. The inorganic phosphate compound comprises less than 1%, less than 0.1%, less than 0.01%, less than 0.001%, less than 0.0001%, less than 0.00001%, less than 0.000001% unreacted, crystalline inorganic acid phosphate of an average particle size greater than about 60 micron, 50 micron, 40 micron, 30 micron, or 20 micron. Residual unreacted inorganic acid phosphate can be determined using a number of techniques including but not limited to x-ray crystallography, Raman spectroscopy, FT-IR spectroscopy, optical microscopy, porosity measurements, density measurements, and the like. In one aspect, the inorganic phosphate prepared in accordance with the present disclosure as a density less than 1.8 g/cm$^3$. In another aspect, the inorganic phosphate prepared in accordance with the present disclosure as a density less than 1.5 g/cm$^3$.

In another aspect, the instant corrosion resistant coatings can be formulated to provide aesthetic properties, such as color, proper shine, and texture. This effect may be achieved, for example, by adding pigments, color aggregate, crushed glass, sand, etc., to the instant acidic phosphate/alkaline metal oxide/hydroxide formulations. For example, the resulting coating comprising crushed glass prepared by the processes disclosed herein provides a very dense glassy surface. Additional suitable ceramic pigments may be further added to produce colored paints. Soluble glass in combination with the instant compositions above can also be used in formulations for coating of solid objects, to provide very dense, glassy solid coatings having corrosion resistance.

Experimental Section

The following examples are illustrative of the embodiments presently disclosed, and are not to be interpreted as limiting or restrictive. All numbers expressing quantities of ingredients, reaction conditions, and so forth used herein may be understood as being modified in all instances by the term "about." Accordingly, unless indicated to the contrary, the numerical parameters set forth herein may be approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Several experimental examples, listed below, were conducted in order to formulate, coat, and demonstrate the attributes of the instant compositions disclosed herein.

A range of phosphate compositions may be used as the corrosion inhibitor coatings commensurate with the spirit and scope of that disclosed and described herein, the following exemplary, non-limiting examples are provided:

TABLE 1

Exemplary Phosphate Ceramic Compositions

| Sample | Part A Weight percent (%) of Part A | Part B Weight percent (%) of Part B |
|---|---|---|
| A | mono potassium phosphate (MKP) (~63-64%) of an average particle size of about 20 micron phosphoric acid (~8%) xanthan gum (0.15%) crystalline SiO$_2$ (~1.5%) remainder water | magnesium hydroxide (~38-39%) wollastonite (~20-21%) xanthan gum (0.07%) remainder water ~27-28% |
| B | Mono Potassium Phosphate (MKP) (~63-64%) of an average particle size of about 20 micron phosphoric acid (~6%) xanthan gum (0.15%) crystalline SiO$_2$ (~1%) calcined kaolin (~12%) remainder water | magnesium hydroxide (~40%) xanthan gum (0.07%) K$_3$PO$_4$ (~3.5%) remainder water |
| Control | mono potassium phosphate (MKP) (~63-64%) average particle size about 200-700 microns phosphoric acid (~8%) xanthan gum (0.15%) crystalline SiO$_2$ (~1.5%) remainder water | magnesium hydroxide (~38-39%) wollastonite (~20-21%) xanthan gum (0.07%) remainder water ~27-28% |

Samples A and B and Control when field tested on storage tanks showed that the Control samples containing larger average particle size MKP were more likely, if not consistently, prone to pitting, galling, cracking, and staining that was visible upon inspection after four months. In contrast, Samples A and B, using smaller average particle size MKP, did not show visible signs of coating-induced corrosion or pitting and further, provided excellent resistance to environmentally-caused corrosion events such as salt spray, rain, and humidity.

What is claimed:

1. A phosphate ceramic precursor composition comprising:
   an aqueous mixture of suspended, dispersed, or slurried particles of an acid-phosphate of chemical formula A$^m$(H2PO4)m.nH$_2$O, where A is hydrogen ion, ammonium cation, metal cation, or mixtures thereof; where m=1-3, and n=0-6, adjusted to a pH of about 2 to about 5, wherein the particles of the acid-phosphate have an average particle size of less than 30 microns, and about 90 percent of the particles of the acid-phosphate have a particle size distribution of less than 30 microns; and
   an aqueous mixture of suspended, dispersed, or slurried particles of an alkaline oxide or alkaline hydroxide represented by B$^{2m}$O$_m$, B(OH)$_{2m}$, or mixtures thereof, where B is an element of valency 2m, where m=1, 1.5, or 2 adjusted to a pH of between 9-14 and configured for combination and at least partial reaction with the acid-phosphate to provide a phosphate ceramic; and
   wherein the suspended, dispersed, or slurried particles of the acid-phosphate are present in an amount of at least about 60 wt % to about 80 wt % in the aqueous mixture thereof.

2. The phosphate ceramic precursor composition of claim 1, wherein the aqueous mixture of suspended, dispersed, or slurried particles of acid-phosphate comprises mono potassium phosphate or mono calcium phosphate, and optionally about 2 to about 10 wt % phosphoric acid of the aqueous mixture thereof, and wherein the alkaline oxide or alkaline hydroxide is magnesium oxide, calcium oxide, magnesium hydroxide or calcium hydroxide.

3. The phosphate ceramic precursor composition of claim 2, further comprising at least one selected from the group of a mineral silicate, wollastonite, talc, amorphous magnesium silicate, amorphous calcium silicate, diatomaceous earth, silicon dioxide and amorphous silicon dioxide, and a rheology modifier/suspending agent, wherein the rheology modifier/suspending agent is at least one selected from the group of guar gum, diutan gum, welan gum, and xanthan gum present in an amount of 0.15-15 weight percent of either aqueous mixture of acid-phosphate or alkaline oxide or alkaline hydroxide.

4. A method of providing corrosion protection to a metal surface, the method comprising:

contacting a metal surface with a first component and a second component, in any order or in combination;

wherein the first component comprises an aqueous mixture of suspended, dispersed, or slurried particles of an acid-phosphate of chemical formula $A^m(H2PO4)_m \cdot nH_2O$, where A is hydrogen ion, ammonium cation, metal cation, or mixtures thereof; where m=1-3, and n=0-6 adjusted to a pH of about 2 to about 5, wherein the particles of the acid phosphate have an average particle size of less than 30 microns, and about 90 percent of the particles of the acid phosphate have a particle size distribution of less than 30 microns; and wherein the second component comprises an aqueous mixture of suspended, dispersed, or slurried particles of an alkaline oxide or alkaline hydroxide represented by $B^{2m}O_m$, $B(OH)_{2m}$, or mixtures thereof, where B is an element of valency 2m where m=1, 1.5, or 2 adjusted to a pH of between 9-14 and configured for combination and at least partial reaction with the first component to provide a phosphate ceramic; and wherein the suspended, dispersed, or slurried particles of the acid-phosphate are present in an amount of at least about 60 wt % to about 80 wt % in the aqueous mixture thereof;

providing corrosion protection to the metal surface.

5. The method of claim 4, wherein the first component comprises a dihydrogen phosphate salt of formula $M^m(H_2PO_4)_m$, its hydrates, or mixtures thereof; where M is sodium, potassium, magnesium, calcium, aluminum, or mixtures thereof, and m is 1-3.

6. The method of claim 4, wherein the first component comprises water and mono potassium phosphate or mono calcium phosphate, and optionally, about 2 to about 10 wt % phosphoric acid, and wherein the second component is water and magnesium oxide, calcium oxide, magnesium hydroxide or calcium hydroxide.

7. The method of claim 4, wherein the second component is present in an amount of at least about 60 wt % to about 80 wt % in the aqueous mixture thereof.

8. A product coated by the method of claim 4.

* * * * *